E. A. CASEY.
HOT AIR CANDY COOKER.
APPLICATION FILED MAR. 1, 1921.
1,385,113.
Patented July 19, 1921.
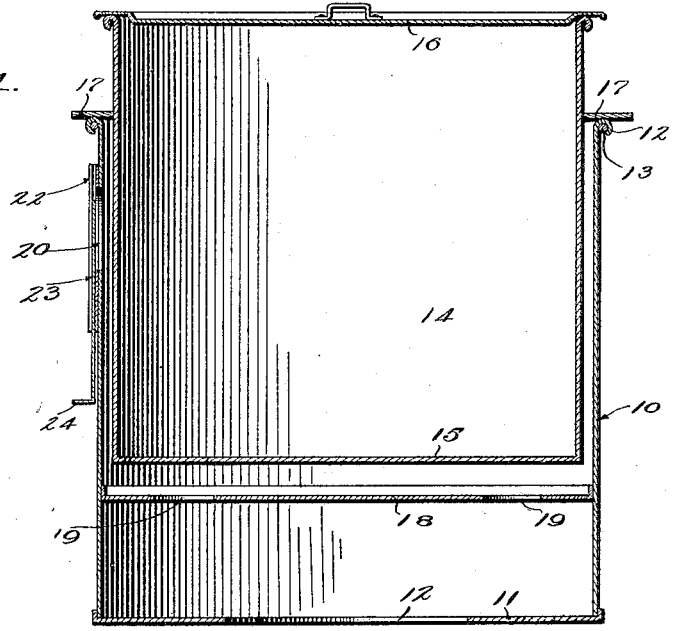
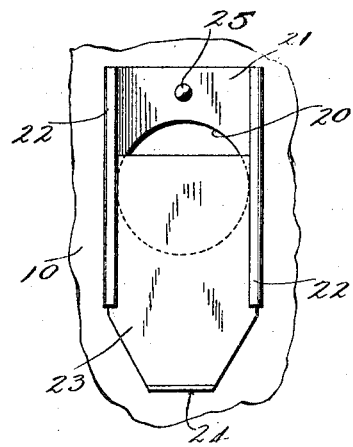
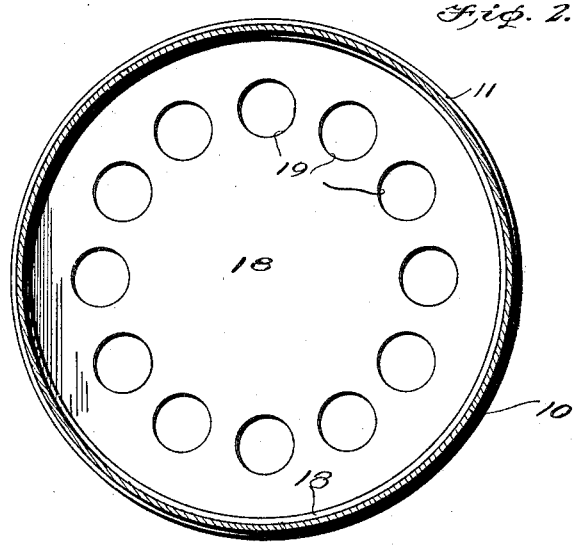
WITNESSES
INVENTOR
Elizabeth Agnes Casey,
BY
ATTORNEYS

UNITED STATES PATENT OFFICE.

ELIZABETH AGNES CASEY, OF PITTSBURGH, PENNSYLVANIA.

HOT-AIR CANDY-COOKER.

1,385,113.

Specification of Letters Patent.  Patented July 19, 1921.

Application filed March 1, 1921. Serial No. 448,943.

*To all whom it may concern:*

Be it known that I, ELIZABETH AGNES CASEY, a citizen of the United States, and a resident of Pittsburgh, in the county of Allegheny and State of Pennsylvania, have invented certain new and useful Improvements in Hot-Air Candy-Cookers, of which the following is a specification.

My present invention relates generally to hot air cookers capable of advantageous use in connection with the making of candies, jellies, jams, preserves, butters and marmalade, and particularly to a cooker which permits of the circulation of hot air especially around the bottom and lower sides of the receptacle in which the material is boiled, my object being the provision of a cooker in which the heat is confined, controlled and regulated so as to bring the syrup or other material to be boiled to the required high temperature in the quickest possible time and also to eliminate all possibility of burning or scorching the material in course of preparation.

The cooking of certain materials, particularly in the making of candies, preserves and the like requires that a high temperature be continuously maintained as nearly as possible from the beginning to the end of the operation, and is in every instance attended by continual danger of burning or scorching in the ordinary kitchen cooking vessel. My invention seeks to provide an arrangement in which the required high temperature may be quickly obtained and readily maintained without such danger, and to this end my invention proposes a cooker which I will now describe with respect to the accompanying drawing forming a part of this application, and wherein, Figure 1 is a vertical transverse section through the complete device, Fig. 2 is a horizontal section through the casing taken in a plane below the receptacle and above the false bottom, and Fig. 3 is a side view, enlarged, of a portion of the casing.

Referring now to these figures the hot air candy cooker proposed by my invention includes two compartments, an outer vertical cylindrical compartment 10 which is the casing, the lower end of which has a base 11 provided with an enlarged central opening for the inlet of heat into the lower portion of the casing.

The upper end of the casing is open and preferably has its upper edge 12 rolled around a reinforcing rod and the like 13 to form an effective support for the other compartment 14 in the nature of a vertical cylindrical receptacle whose base 15 is closed and whose upper open end receives a cover 16.

This second compartment or boiling receptacle 14 has an external annular flange or rib 17 which rests upon the rolled upper edge of the first compartment or casing 10. This flange or rib 17 thus supports the lower portion of the inner compartment or receptacle 14 within the upper portion of the casing 10, it being noted that the receptacle 14 is of substantially less diameter than that of the casing so as to leave an annular space within the casing around the inwardly projecting portion of the receptacle below flange 17.

Flange 17 not only supports the closed base 15 of the receptacle substantially above the centrally apertured base 11 of the casing, but also above a bottom plate 18 which is fixed in the casing 10 parallel within and spaced above its base 11 and has an annular series of openings 19 whereby to permit the heat to rise within the casing around the lower portion of the receptacle which series of openings 19 is on a circle, the radius of which is greater than the radius of opening 12 in the base 11, so that flame cannot reach the receptacle 14.

For the control of the temperature the upper portion of the casing 10 has a heat outlet opening 20 and is provided with an external plate 21 around this opening having parallel side guides 22 for the side edges of a controlling slide 23 whose lower end is bent to form a handle 24 whereby it may be shifted vertically in the guides 22 to more or less cover the opening 20. The guides 22 frictionally clasp the edges of the slide so that the latter will be effectively held in various adjusted positions, and plate 21 is preferably provided with a boss 25 to form a stop for the upper edge of slide 23 when the opening 20 is fully closed.

By thus constructing the cooker I am enabled to confine, control and regulate the heat so as to bring material within the receptacle 14 to the high temperatures in the quickest possible time, and eliminate all danger of burning or scorching which has heretofore been the main difficulty in the making of candies, jellies, jams, preserves, butters, marmalades and the like.

I claim:

1. A candy cooker comprising an outer casing having an apertured base and an apertured bottom plate spaced above the base and both extending entirely across the casing with their apertures disalined, and a receptacle depending into the casing, having a removable cover and means engaging the casing and supporting the base of the receptacle in spaced relation above the bottom plate of the casing, said casing being of greater diameter than the receptacle whereby a space is formed therein around the receptacle and also having manually controlled heat outlet means located therein above the base of the receptacle as described.

2. A candy cooker comprising an outer casing having an apertured base and an apertured bottom plate spaced above the base and extending entirely across the casing, the apertures of which are entirely disalined with respect to that of the base, and a receptacle depending into the casing, having a removable cover and means engaging the upper edge of the casing and supporting the base of the receptacle in spaced relation above the bottom plate of the casing, said casing having a heat outlet opening in its wall located above the base of the receptacle, and a manually controlled slide member forming an adjustable cover for said opening as described.

ELIZABETH AGNES CASEY.